United States Patent
Nykamp

(10) Patent No.: US 8,762,856 B2
(45) Date of Patent: Jun. 24, 2014

(54) SYSTEM AND METHOD FOR COLLABORATIVE INFORMATION DISPLAY AND MARKUP

(75) Inventor: Paul Nykamp, Toronto (CA)

(73) Assignee: Reliable Tack Acquisitions LLC, Wilmington, DE (US)

(*) Notice: Subject to any disclaimer, the term of this patent is extended or adjusted under 35 U.S.C. 154(b) by 1156 days.

(21) Appl. No.: 12/171,820

(22) Filed: Jul. 11, 2008

(65) Prior Publication Data

US 2008/0313546 A1      Dec. 18, 2008

Related U.S. Application Data

(63) Continuation of application No. PCT/CA2007/000048, filed on Jan. 15, 2007.

(60) Provisional application No. 60/758,552, filed on Jan. 13, 2006.

(51) Int. Cl.
    *G06F 3/048* (2013.01)

(52) U.S. Cl.
    USPC .......................................................... 715/738

(58) Field of Classification Search
    USPC .................... 715/751, 759, 733, 738
    See application file for complete search history.

(56) References Cited

U.S. PATENT DOCUMENTS

| | | | |
|---|---|---|---|
| 4,949,248 A | 8/1990 | Caro | |
| 5,008,853 A | 4/1991 | Bly et al. | |
| 5,220,657 A | 6/1993 | Bly et al. | |
| 5,235,680 A | 8/1993 | Bijnagte | |
| 5,392,400 A | 2/1995 | Berkowitz et al. | |
| 5,572,430 A | 11/1996 | Akasaka et al. | |
| 5,808,662 A | 9/1998 | Kinney et al. | |
| 5,812,130 A | 9/1998 | Van Huben et al. | |
| 5,844,553 A | 12/1998 | Hao et al. | |
| 5,844,554 A | 12/1998 | Geller et al. | |
| 5,862,330 A | 1/1999 | Anupam et al. | |
| 5,899,810 A | 5/1999 | Smith | |
| 5,940,082 A * | 8/1999 | Brinegar et al. | 345/442 |
| 5,974,446 A | 10/1999 | Sonnenreich et al. | |
| 5,978,648 A | 11/1999 | George et al. | |
| 6,025,846 A | 2/2000 | Chudley | |
| 6,108,687 A | 8/2000 | Craig | |
| 6,151,621 A * | 11/2000 | Colyer et al. | 709/204 |

(Continued)

FOREIGN PATENT DOCUMENTS

| | | |
|---|---|---|
| EP | 0319232 A2 | 6/1989 |
| EP | 0717544 A2 | 6/1996 |

(Continued)

OTHER PUBLICATIONS

Rosenbloom, "A Game Experience—in Every Application", Communications of the ACM, Jul. 2003, vol. 46, Issue 7, p. 28-31.

(Continued)

*Primary Examiner* — Omar Abdul-Ali
*Assistant Examiner* — Anil Bhargava

(57) ABSTRACT

The present invention provides a system that allows documents of various types to be shared between users at geographically dispersed client computers. The users may contemporaneously manipulate the documents and each user's manipulations are displayed to the other users in real time using a lightweight synchronization process.

21 Claims, 8 Drawing Sheets

(56) References Cited

U.S. PATENT DOCUMENTS

| | | | |
|---|---|---|---|
| 6,151,622 | A | 11/2000 | Fraenkel et al. |
| 6,181,689 | B1 | 1/2001 | Choung et al. |
| 6,201,948 | B1 | 3/2001 | Cook et al. |
| 6,212,192 | B1 | 4/2001 | Mirashrafi et al. |
| 6,215,498 | B1 | 4/2001 | Filo et al. |
| 6,285,369 | B1* | 9/2001 | Kross et al. ............... 345/419 |
| 6,295,551 | B1 | 9/2001 | Roberts et al. |
| 6,330,685 | B1* | 12/2001 | Hao et al. ............... 714/1 |
| 6,343,313 | B1 | 1/2002 | Salesky et al. |
| 6,591,247 | B2 | 7/2003 | Stern |
| 6,591,278 | B1 | 7/2003 | Ernst |
| 6,604,134 | B2 | 8/2003 | Haury |
| 6,606,479 | B2 | 8/2003 | Cook et al. |
| 6,769,031 | B1 | 7/2004 | Bero |
| 6,769,130 | B1 | 7/2004 | Getsin et al. |
| 6,785,679 | B1 | 8/2004 | Dane et al. |
| 6,791,549 | B2 | 9/2004 | Hubrecht et al. |
| 7,039,723 | B2 | 5/2006 | Hu et al. |
| 7,046,269 | B2 | 5/2006 | Parker et al. |
| 7,114,172 | B2 | 9/2006 | Lord |
| 7,149,959 | B1* | 12/2006 | Jones et al. ............... 715/234 |
| 7,458,091 | B1 | 11/2008 | Getsin et al. |
| 7,533,182 | B2 | 5/2009 | Wurtzel et al. |
| 7,580,867 | B2* | 8/2009 | Nykamp ............... 705/26.41 |
| 7,593,605 | B2* | 9/2009 | King et al. ............... 382/313 |
| 7,627,808 | B2 | 12/2009 | Blank et al. |
| 2001/0032140 | A1 | 10/2001 | Hoffman |
| 2001/0049721 | A1 | 12/2001 | Blair et al. |
| 2002/0010655 | A1* | 1/2002 | Kjallstrom ............... 705/27 |
| 2002/0049786 | A1* | 4/2002 | Bibliowicz et al. ............... 707/511 |
| 2002/0072955 | A1 | 6/2002 | Brock |
| 2002/0083145 | A1 | 6/2002 | Perinpanathan |
| 2002/0085030 | A1 | 7/2002 | Ghani |
| 2002/0124252 | A1 | 9/2002 | Schaefer et al. |
| 2002/0129106 | A1* | 9/2002 | Gutfreund ............... 709/205 |
| 2002/0149617 | A1 | 10/2002 | Becker |
| 2002/0188679 | A1 | 12/2002 | Matous et al. |
| 2002/0194095 | A1 | 12/2002 | Koren |
| 2003/0018643 | A1 | 1/2003 | Mi et al. |
| 2003/0023754 | A1 | 1/2003 | Eichstadt et al. |
| 2003/0023759 | A1 | 1/2003 | Littleton et al. |
| 2003/0093286 | A1 | 5/2003 | Myers et al. |
| 2003/0112273 | A1* | 6/2003 | Hadfield et al. ............... 345/751 |
| 2003/0126211 | A1 | 7/2003 | Anttila et al. |
| 2003/0182168 | A1 | 9/2003 | Lyons |
| 2003/0195803 | A1 | 10/2003 | Ketonen |
| 2004/0041841 | A1 | 3/2004 | LeMogne et al. |
| 2004/0102244 | A1* | 5/2004 | Kryuchkov et al. ............... 463/32 |
| 2004/0125133 | A1* | 7/2004 | Pea et al. ............... 345/751 |
| 2004/0143603 | A1 | 7/2004 | Kaufmann et al. |
| 2004/0193425 | A1 | 9/2004 | Tomes |
| 2004/0221296 | A1* | 11/2004 | Ogielski et al. ............... 719/313 |
| 2006/0002681 | A1 | 1/2006 | Spilo et al. |
| 2006/0010125 | A1* | 1/2006 | Beartusk et al. ............... 707/4 |
| 2006/0044307 | A1* | 3/2006 | Song ............... 345/419 |
| 2006/0265496 | A1* | 11/2006 | Freitag ............... 709/224 |
| 2008/0046828 | A1* | 2/2008 | Bibliowicz et al. ............... 715/751 |
| 2010/0077316 | A1* | 3/2010 | Omansky et al. ............... 715/751 |
| 2010/0205537 | A1* | 8/2010 | Knighton et al. ............... 715/751 |
| 2013/0073981 | A1* | 3/2013 | Pea et al. ............... 715/751 |

FOREIGN PATENT DOCUMENTS

| | | |
|---|---|---|
| EP | 0 667 972 | 11/1996 |
| EP | 0 898 756 | 5/2000 |
| EP | 1217560 A1 | 6/2002 |
| EP | 0870234 B1 | 3/2003 |
| EP | 1212679 B1 | 6/2003 |
| WO | 9619064 A3 | 6/1996 |
| WO | 9921117 A1 | 4/1999 |
| WO | 9957900 A1 | 11/1999 |
| WO | 0140893 A3 | 6/2001 |
| WO | 02071173 A2 | 9/2002 |
| WO | WO-03/041033 | 5/2003 |
| WO | 2004001618 A1 | 12/2003 |
| WO | WO-2004/015897 | 2/2004 |
| WO | 2004083977 A1 | 9/2004 |

OTHER PUBLICATIONS

Wang et al., "A Java 3D-Enabled Cyber Workspace", Communications of the ACM, Nov. 2002, vol. 45, Issue 11, p. 45-49.

Chang et al., "A Pilot Study of Role-Interplay in a Web Based Learning Environment", Educational Media International, Mar. 2002, vol. 39, Issue 1, p. 75-85.

Yanrong et al., "An Asynchronous and Synchronous Coupling Approach in Networked Rapid Product Development", International Journal of Advanced Manufacturing Technology, Sep. 2003, vol. 22, Issue 1/2, p. 26-32.

Kolatkar et al., "A 3D Community-Based, Real-Time Collaboration Tool for Scientific Research and Training", PLoS ONE, 2008, vol. 3, Issue 2, p. 1-9.

Qingjin et al., "Enchanced Integrated Manufacturing Systems in an Immersive Virtual Environment", Proceedings of the Institution of Mechanical Engineers—Part B—Engineering Manufacture, Mar. 2007, vol. 221, Issue 3, p. 477-487.

Benford et al., "Example CVEs", Communications of the ACM, Jul. 2001, vol. 44, Issue 7, p. 82-83.

Madsen et al., "Experiences Using Cooperative Interactive Storyboard Prototyping", Communications of the ACM, Jun. 1993, vol. 36, Issue 6, p. 57-64.

Robertson et al., "Information Visualization Using 3D Interactive Animation", Communications of the ACM, Apr. 1993, vol. 36, Issue 4, p. 57-71.

Jiang et al., "Internet Based Design System for Globally Distributed Concurrent Engineering", Cybernetics & Systems, Oct. 2001, vol. 32, Issue 7, p. 737-754.

Huang et al., "Web-Based Collaborative Conceptual Design", Journal of Engineering Design, Jun. 1999, vol. 10, Issue 2, p. 183-194.

Li et al., "Web-Based Interactive 3D Visualization for Computer Graphics Education", International Journal of Distance Education Technologies, Jul.-Sep. 2003, vol. 1, Issue 3, p. 69.

Li et al., "A Distributed Feature-based Environment for Collaborative Design", Singapore Institute of Manufacturing Technology, Systemics, Cybernetics and Informatics, vol. 1, No. 1, p. 3-8.

International Preliminary Report on Patentability for PCT/CA2007/000048, issued Jul. 16, 2008.

International Search Report and Written Opinion for PCT/CA2007/000048, mailed May 22, 2007.

* cited by examiner

US 8,762,856 B2

SYSTEM AND METHOD FOR COLLABORATIVE INFORMATION DISPLAY AND MARKUP

FIELD OF THE INVENTION

This invention relates to a system for collaborative information display and markup. More particularly, the invention relates to a system that allows multiple users to simultaneously view a document and markups made to the document by one or more of the users.

BACKGROUND OF THE INVENTION

It is often desirable for persons located in disparate locations to collaborate to produce a common product. In many cases these persons must travel to a single location to facilitate such collaboration. There is increasing interest in collaboration tools that allow such persons to work at their disparate locations while still viewing the same information and collaborating together in real time. The existing tools for such collaboration are limited in functionality and efficiency. For example, the some of the existing collaboration tools are limited to a single or very few document types and cannot practically be expanded beyond those document types. Other tools are very inefficient with respect to synchronization of information displayed to different users, with the result that the different users cannot share information practically in real time, but must deal with long latency periods.

Accordingly, there is a need for a system that efficiently allows collaborative sharing of different document types.

SUMMARY OF THE INVENTION

The present invention provides a system that allows documents of various types to be shared between users at geographically dispersed client computers. The users may contemporaneously manipulate the documents and each user's manipulations are displayed to the other users in real time using a lightweight synchronization process.

The term "document" is used herein to refer generally to a data object that can be outputted using output devices coupled to a computer system. The output devices may be graphical, such as a display screen, audible, such as a speaker or may be any other type of output peripheral. A document may be a text document, a 2D or 3D graphical image, a spreadsheet, a video stream or clip, an audio stream or clip or any other type of document. A document may be formatted in accordance with any format such as an MS Word format document, a MP3 format audio file, a Real format audio/video stream or another suitable format.

In one embodiment of the invention, there is provided a system including a server and two or more client computers. The server includes a server communications module and a data storage device.

The client computers include a collaboration module. The collaboration module includes a client services module, one or more document objects and a display module. The client computers include input and output devices. The collaboration module at each client computer displays a user interface on an output device such as a display screen. The display module displays documents on the output device as part of the user interface under the control of the document objects and possibly other parts of the collaboration module.

The client services module includes a client communications module, a markup services module, a document module and a view services module.

Each document displayed at a client computer is associated with at least one of the document objects, based on the type of document. For example, a panoramic image document will be associated with a document object capable of controlling the display of such a document.

During use of the system, one of the users is a controlling user and the remaining users are viewing users. The controlling user may select a document to be loaded into the system. The selected document is loaded at the server by the server communications module from the data storage device (or from another device to which the server communications module has access). The server communications module then transmits a copy of the loaded document to client communications module at each of the client computers, including the controlling client computer. The client communications module provides the document to the document module. The document module then activates or instantiates a version of a document object associated with the loaded document. The document object instructs the display module to display the document in an initial state. The loaded document is displayed at the viewing client computers by the document module and a document object in a manner analogous to that at the controlling client computer.

Alternatively, a document may initially be loaded at the controlling user's client computer (or controlling client computer). When a document is loaded, the document module may retrieve the document from a storage device accessible to the collaboration module. The document service module may then activate or instantiate a version of a document object with the loaded document. A copy of the loaded document is sent by the client communications module at the controlling client computer to the server communications module, where it is stored on the storage device. The server communications module forwards a copy of the loaded document to the client communications module at each of the viewing user's client computers (or viewing client computers).

The document object may provide document manipulation tools that allow the controlling user to manipulate the display of a displayed document. For example, the document manipulation tools may allow the controlling user to change the part of the document that is displayed by the display module by moving the document within a document display window or by zooming in or out from the document.

The document object maintains a display state for the document that defines how the object is currently displayed. The details of the display state will depend on the specific type of document. The display state is recorded as a lightweight description of the document. For example, a rotational view document which may include numerous individual 2D images of a 3D item. When the rotational view document is first loaded at a controlling client computer, a copy of the entire document is transmitted to all of the viewing client computers. The display state of the document may be defined by the setting out the particular one of the 2D images to be displayed and the section of the 2D image and zoom level for the display. This display state information is much smaller than the original document.

Each manipulation by the controlling user is transmitted to the server by transmitting the resulting display state of the document. The server records the new display state and then transmits it to the collaboration module at each viewing client computer. The collaboration module in each client computer then updates its display of the document to match the display at the controlling client computer. In this way, the controlling user's manipulations are efficiently propagated to all viewing client computers and each of the users contemporaneously sees the same view of the document.

The markup services module in the collaboration module allows a user to superimpose markups items such as text, lines, circles, etc. The markup services module instructs the display module to overlay or superimpose markups over top of a particular display of a document. The current set of markups at any particular time may be referred to as the markup state. Markups added by the controlling user are also transmitted to the viewing client computers through the server, as described above. Only changes to markups are transmitted as new markup items are added, deleted or changed. At the end of each such markup addition, deletion or change, it is transmitted to each viewing client computer, and each viewing user is able to see the markups contemporaneously as the controlling user adds them.

This embodiment allows particular views of a document to be saved by the controlling user. The controlling user may save the current view of a document. The current view is a combination of the display state of the document and the markup state. The view is saved locally along with the display state and the markup state. A name is assigned to the view and the name is displayed in a views list. The view is also transmitted to each of the viewing client computers and the name of the view, the associated display state and the associated markup state are stored at the viewing client computers. The view name is also displayed on the view lists at the viewing client computers.

Subsequently the controlling user can redisplay a view. The display state and the markup state associated with the view are displayed on the controlling client computer. The collaboration module at the controlling client computer transmits the instruction to display a saved view to the server, which forwards it to the viewing client computers. The saved view is thus displayed contemporaneously at each client computer.

A viewing user may become the controlling user by clicking a Take Control button on the user interface on the viewing user's client computer. When a viewing user does so, that user becomes the controlling user. The new controlling users client computer transmits a message to the server indicating the change. The server forwards the message to at least the previous controlling computer and the previous controlling user becomes a viewing user.

In other embodiments of the invention, a voice chat or video chat facility may be provided to allow the users to have audio or video communication while they are collaborating.

In other embodiments, the services module may provide some document manipulation tools in addition to document manipulation tools provided by the document objects. In this case, the services module will transmit instructions to the display module to change the display of a document in accordance with usage of the basic manipulation tools by the controlling user. In such an embodiment, the display state of a document will include the display state based on manipulation tools offered by both the relevant document object and the services module.

Different embodiments of the invention may provide support for different types of documents. Several different documents are described below, including rotational view, panoramic, planogram and video documents. By adding different document objects to an embodiment, the supported document types can be changed and added to. Since the display state of a document is entirely or largely managed by the associated document object, the services module does not require amendment to add a new document type.

Additional aspects of the invention are further described below.

BRIEF DESCRIPTION OF THE DRAWINGS

Several embodiments of the present invention will now be described in detail with reference to the drawings, in which.

DESCRIPTION OF EXEMPLARY EMBODIMENTS

Figure 1:
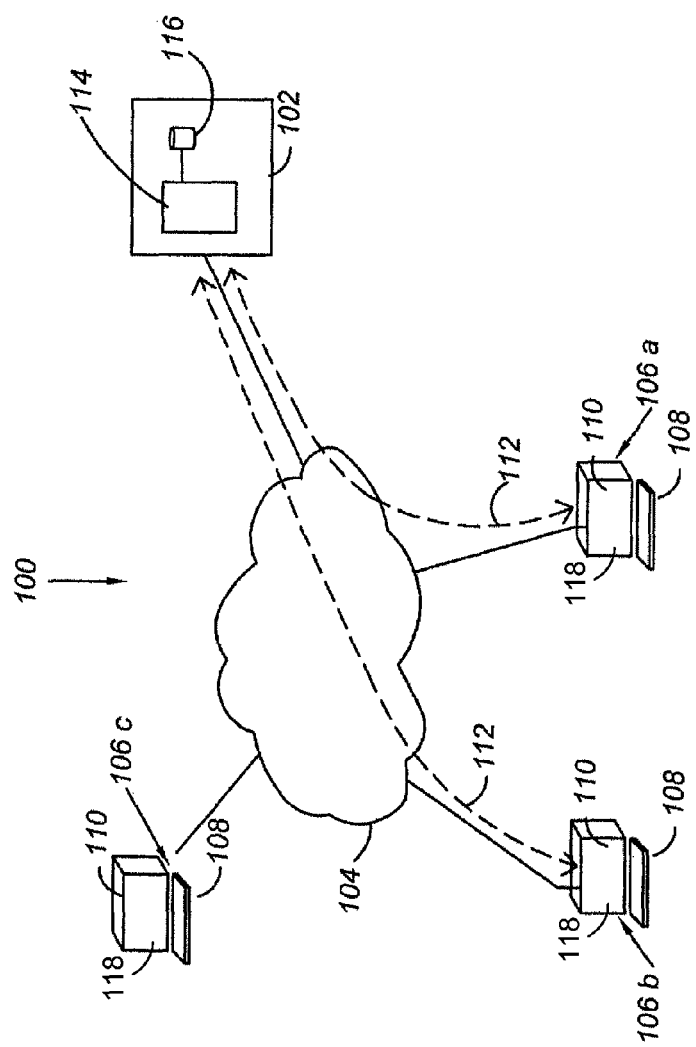
FIG. 1 illustrates a collaborative document sharing and markup system according to the present invention.

Reference is first made to FIG. 1, which illustrates a system 100 for simultaneously and synchronously displaying a document on multiple client computers. System 100 comprises a server 102, a network 104 and two or more client computers 106.

Server 102 hosts a collaborative document sharing service. A collaboration module 118 at each of the client computers 106 communicates with the server 102 to provide the collaborative document sharing service to users (not shown) of the client computers. The client computers 106 communicate with the server 102 through a network 104. Each client computer 106 comprises one or more input devices 108, such as a mouse and keyboard, and a display screen 110.

The server 102 and the client computers 106 may be located in the same location or may be located in different geographical locations. The network 104 may be the Internet, a local area network, an intranet or any other network capable of facilitating communication between computing devices. The network 104 provides a two-way data transmission connection between each client computer and the server, illustrated by double-headed arrows 112, shown in dotted outline in FIG. 1.

The server 102 comprises a server communications module 114 and a memory device 116. The server communications module 114 receives information relating to documents displayed on the client computers 106 and records the received information in the memory device 116. The server communications module 114 also transmits information relating to the documents to the client computers 106.

Figure 2:
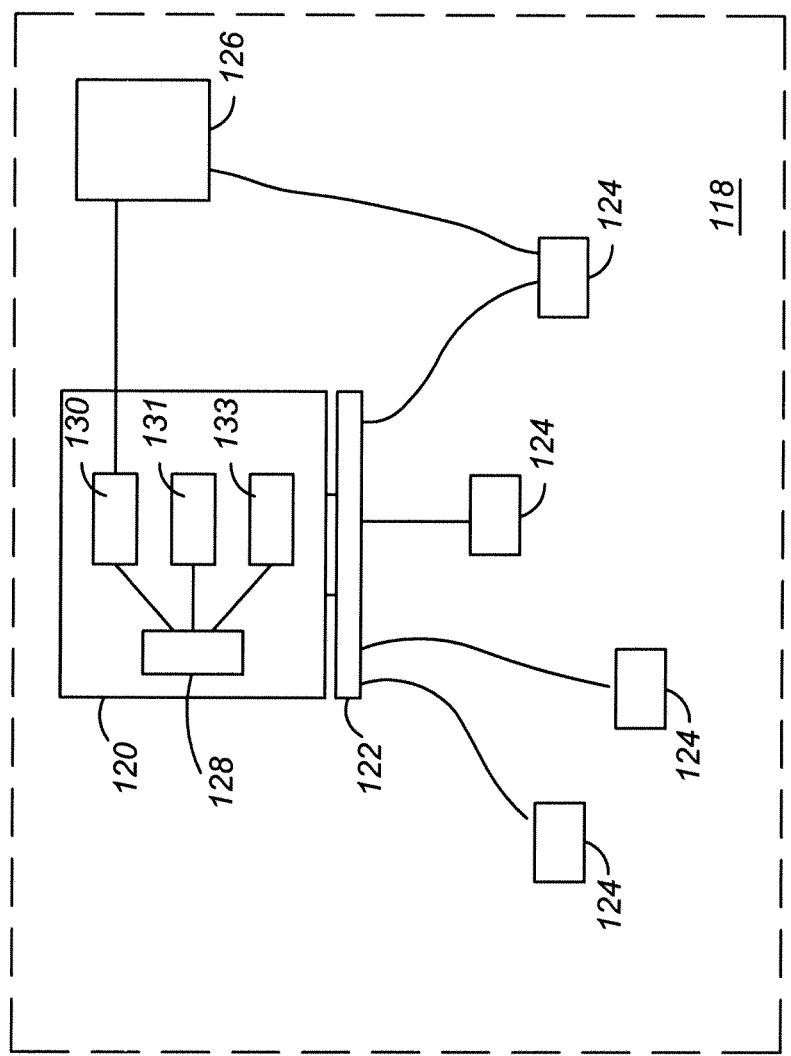
FIG. 2 illustrates various software components of the system of FIG. 1.

Reference is made to FIG. 2, which illustrates a collaboration module 118 that operates on the client computers 106. The collaboration module 118 comprises a client services module 120, one or more document objects 124 and a display module 126.

Client service module 120 includes a client communications module 128, which communicates with the server communications module 114 through network 104. Client services module 120 also includes a markup services module 130, which is used to draw and markup documents, as is further described below. Client services module also includes a document module 131 and a view services module 133.

Each of the document objects 124 relates to one or more documents to be displayed on the display screen 110 of the client computers 106.

The display module 126 is used to display a document using the output devices at a client computer. For example, a display module 126 may be based on Flash™ which allows graphic images, video clips, audio clips and other documents to be displayed or played. The display module 126 receives instructions from a document object 124 instructing the display module 126 to present a document and defining how the document is to be presented. The display module 126 also receives instructions from the markup services module 130 relating to markup elements to be overlaid on the display of a document.

System 100 allows a user of one of the client computers 106 to load a document into a collaboration module 118 operating on the client computer 106. The collaboration module 118 includes a load function that allows the user to select a document stored on a device accessible to the client computer. The loaded document is compatible with at least one of the document objects within the collaboration module 118. The loaded document is displayed on the client computer as follows. The document is retrieved by the document module 131. The document module 131 determines which document object 124 is associated with the loaded document and creates an instance of the document object. The document object 124 opens the document and instructs the display module 126 to display the document in a default or initial display state.

Figure 3:
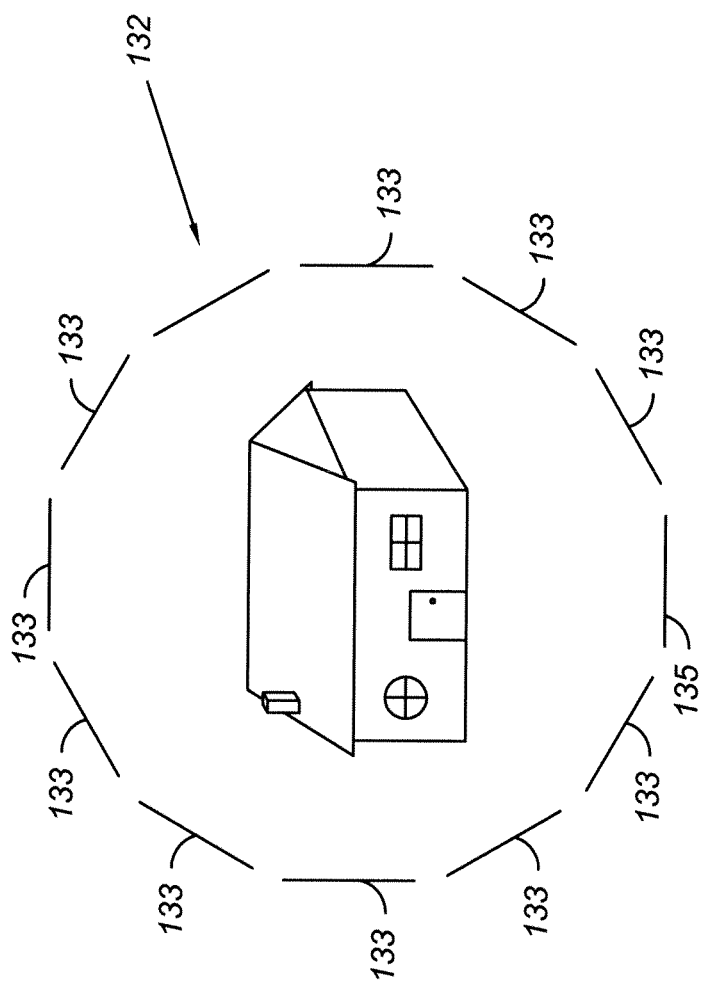
FIG. 3 illustrates an example display window showing a document on a client computer of system 1.

FIG. 3 illustrates a rotational view document 132, which is a first example of a document compatible with the present embodiment of the invention. A rotational view document includes a series of 2D images 133 taken from different angles around a 3D object. One of the images 135 is defined as the initial view image for the document, when it is displayed. Collaboration module 118 includes a rotational view document object 124 that is capable of manipulating and displaying rotational view documents. By displaying different 2D images sequentially, a 3D display of the 3D object can be mimicked.

Figure 4:
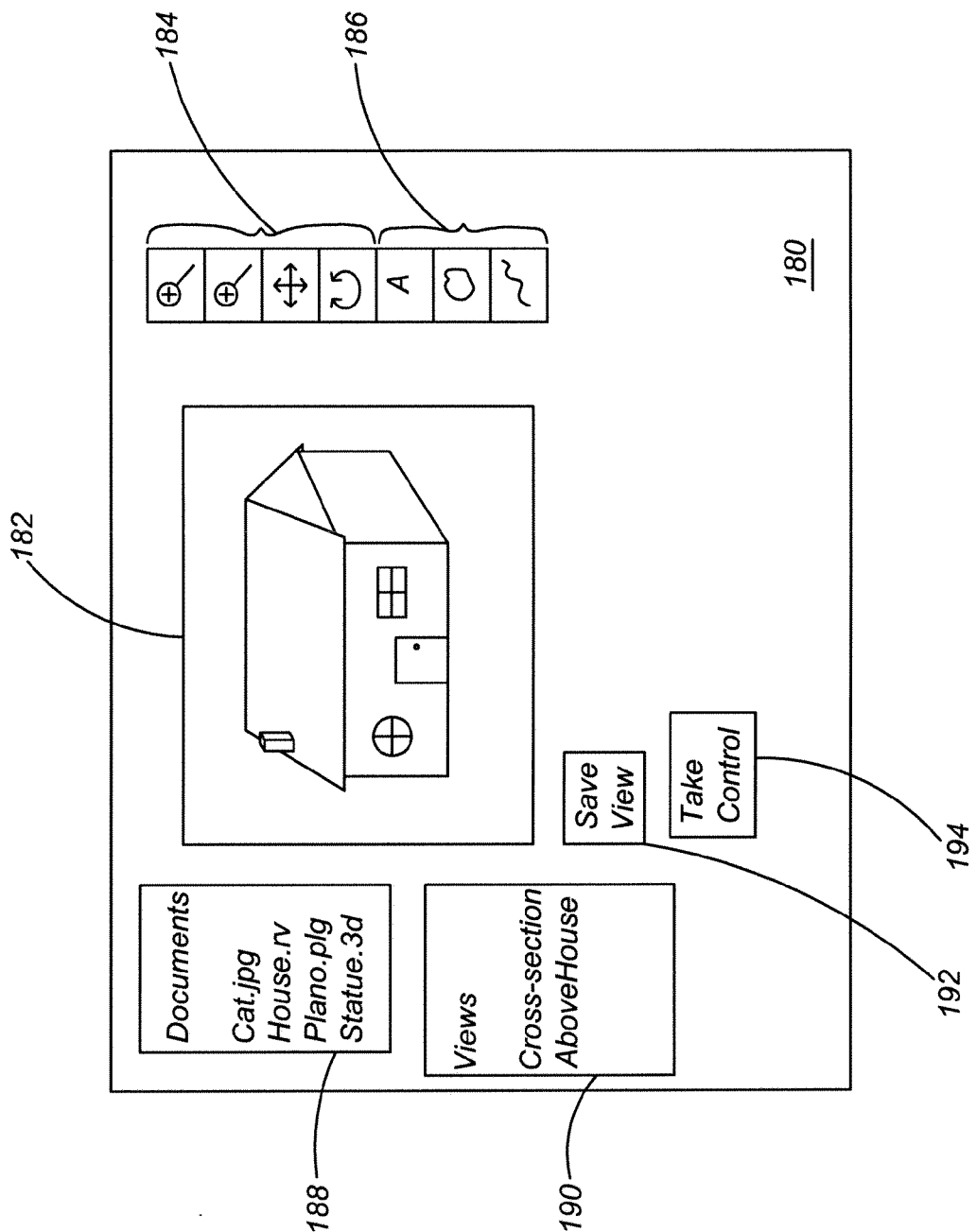
FIG. 4 to 7 illustrate several examples of documents that may be shared using the system of FIG. 1.

FIG. 4 illustrates a user interface 180. User interface 180 is displayed on the display screen 110 of each client computer 106 when system 100 is in use. User interface 180 has a document display window 182, a set of document manipulation icons 184 corresponding to a set of document manipulation tools, a set of markup icons 186 corresponding to a set of markup tools, a documents list 188 and a view list 190.

Document object 124 provides the document manipulation tools for a rotational view document 132. In the present example, a user may manipulate a rotational view document by "rotating" it using a mouse or other input device. As the rotational view document 132 is "rotated" a different 2D image 133 is displayed to mimic the requested rotation. Each image is associated with a range of angles of rotation and is displayed when the image is rotated within the range. While a particular image is displayed, the user may move the display and may zoom in or out of the display. When the display is moved, a reference point (i.e. the upper left corner, the center or another point on or associated with the image) is moved to a different point of the display screen (or a display window if the document is displayed within a window on a screen). The remainder of the image is translated along with the reference point. When the user changes the zoom level, the size of the displayed image is changed. A display state for a rotational view document may be defined by setting out:

(i) an image number: the particular 2D image presently being displayed;
(ii) a displacement: the displacement of the reference point from its initial position (typically by setting out an X direction displacement and a Y direction displacement); and
(iii) a zoom level: the zoom level of the current display.

The rotational view document object 124 allows the user to manipulate the display of a rotational view document 132 to change each of the three variables in the display state. Rotational view document object 124 instructs the display module 126 to display the rotational view document in accordance with the current display state. Rotational view document object 124 provides controls, which may be accessible through icons displayed on the display screen along with the rotational view document, to allow the user to manipulate the rotational view document.

Figure 5:
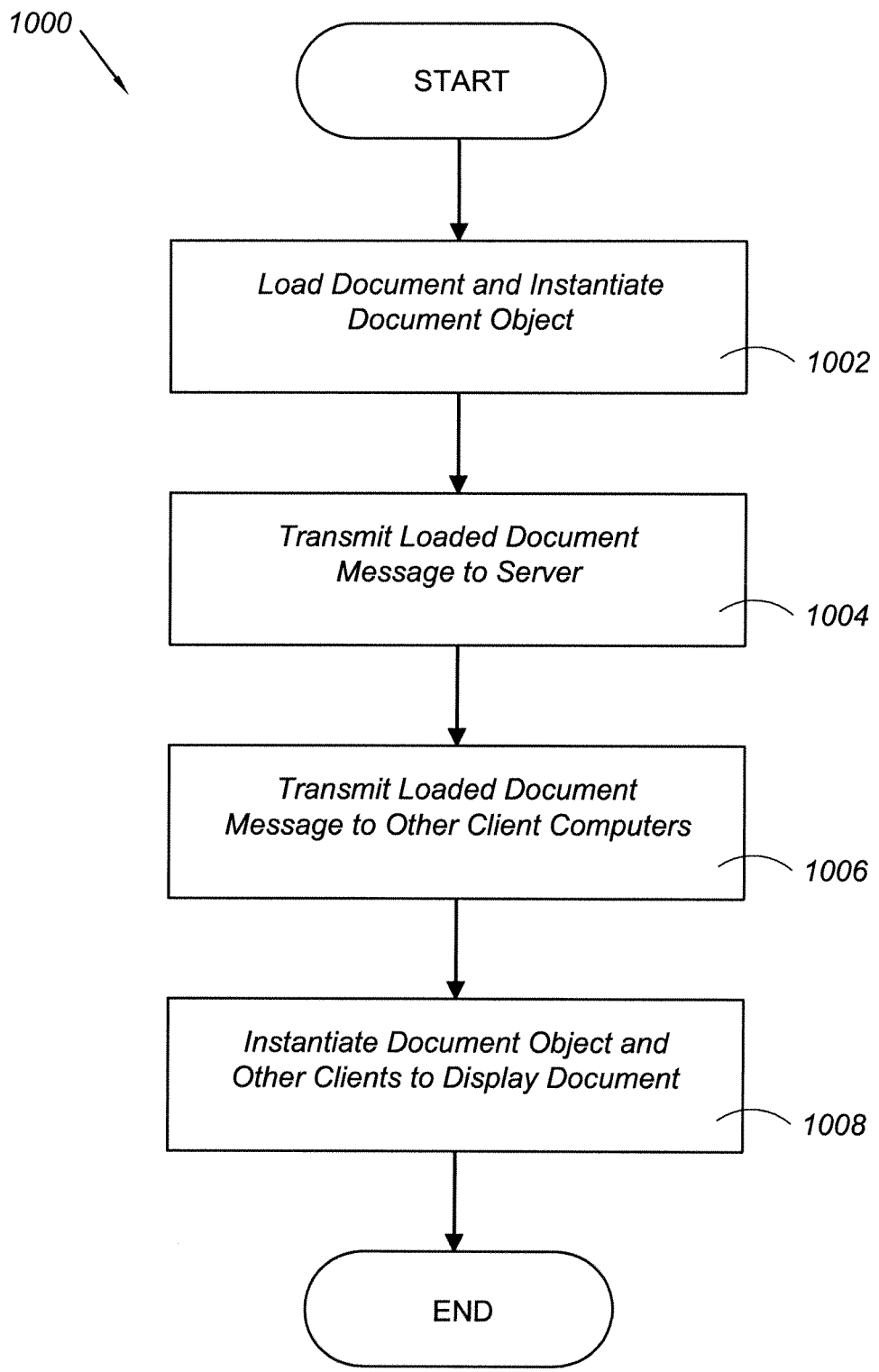

Reference is next made to FIG. 5, which illustrates a method 1000. When a document is loaded into the collaboration module 118 at one client computer 106a by a user, method 1000 is performed to contemporaneously load the document into the collaboration modules 118 at the other client computers 106.

Method 1000 begins at step 1002, in which the document module 131 at the client computer 106a loads the document and instantiates the appropriate document object 124 to display the loaded document.

In step 1004, the document module 131 indicates to the client communications module 128 at the client computer 106a that the document has been loaded. In response, the client communications module 128 transmits a Loaded Document message to the server communications module 114. Loaded Document message includes a copy of the loaded document.

In step 1006, the server communications module 114 records a copy of the loaded document in the memory device 116. The server communications module 114 also transmits a corresponding Loaded Document message to the other client communications modules 128 (client communications modules 128 for the client computers 106b and 106c, in the present example).

In step 1008, each of the client communications modules 128 provides a copy of the loaded document to the document module 131 of the corresponding collaboration module 118. The document module 131 instantiates the document object 124 corresponding to the loaded document. The document object 124 displays the loaded document on the display screen of the client computer, in the same manner in which the loaded document was initially displayed on the display screen of the client computer 106a at which the document was initially loaded. Method 1000 then ends.

This synchronization process results in the loaded document being loaded into each of the client computers and being initially displayed in the same way at each of the client computes.

Method 1000 is an example of a synchronization process repeated during the use of system 100. When a document is displayed, manipulated or amended at one client computer, this synchronization process is used to contemporaneously update the document display window at all other client computers so that all users of the client computers contemporaneously have the same view of the same document.

During the use of system 100, one user will be in "control" of the document display. Each use of the system 100 may be referred to as a "collaboration session". The controlling user is permitted to manipulate the display of the document, change the displayed document, load new documents, markup the displayed document (this is further described below), save particular views of the document and corresponding markups and display stored views using the user interface 180 at the controlling user's own client computer. The manipulations, markups and other display changes are contemporaneously displayed in the user interfaces 180 displayed on the other client computers. The users of these other client computers are viewing the changes made by the controlling user and may be referred to as viewing users. In the present embodiment, each user may take control of the collaboration session by clicking a "Take Control" button 194 on the user interface 180. When a viewing user clicks on the Take Control button 194, the viewing user becomes the controlling user and the previous controlling user becomes a viewing user.

In system 100, each of the client computers 106 initially connects with the server 102 to join the collaboration session. The user of the first client computer to connect with the server becomes the initial controlling user.

In some embodiments, a particular user may be designated as the initial controlling user. In other embodiments, one user may be designated as a host user and may be able to determine who is in control of the session at any particular time. The host user may have a button corresponding to each user on the host user's user interface 180 and may click on the appropriate button to allow the associated user to control the collaboration session. Any other method of selecting or designating a controlling user may also be used.

When the display of a document is manipulated by a controlling user at a controlling client computer 106a, the manipulation is synchronously displayed at each of the viewing client computers 106b and 106c using a synchronization process similar to method 1000. In the present example, all document manipulations are enabled by a document object 124 through the document manipulation tools. The document object 124 at the controlling client computer 106a transmits a New Display State message to the client communications module 128 at the same client computer 106a. The New Display State message indicates the display state of the document. For example, in the case of a rotational view object, the image number, displacement and zoom level of the document as it is currently displayed on the display screen 110 is included in a New Display State message.

The client communications module 128 at the client computer 106a transmits the New Display State message to the server communications module 114. The server communications module 114 stores the New Display State message and transmits a copy of it to each of the other client communications modules 128 at the viewing client computers 106b and 106c. Each of the other client communications modules 128 transmits a Set Display State message to the document object presently controlling the display of the object at the client computer. The Set Display State message includes the display state originally transmitted by the document object 124 at the client computer 106a. The document object changes the display of the object to match the display state set out in the Set Display State message. This method synchronizes the display of the document at all of the client computers.

In the present example, a document object 124 is configured to transmit a New Display State message when (i) a manipulation exceeds a change threshold or (ii) a manipulation ends. The threshold for a manipulation determines the frequency of New Display State messages when a manipulation is ongoing. For example, if a user is moving the currently displayed image in a rotational view document, the threshold might be set at five pixels. If the displayed image is moved more than five pixels in any direction from its position when either the manipulation began or the last New Display State message was sent, then a New Display State message is sent to the client communications module. A New Display State message is also sent at the end of the manipulation. This results in the display of the document being updated on the viewing client computers 106b and 106c contemporaneously with the manipulation of the display on the controlling client computer during and at the end of the manipulation.

In addition to the graphical manipulation tools provided by a document object, collaboration module 118 allows a user to superimpose graphical markups on a markup layer over a displayed document. In the present exemplary embodiment, markup service module 130 provides the set of graphical markup tools including a freehand drawing tool, a circle/ellipse drawing tool and a text tool. Markup services modules in other embodiment may allow a use to add other types of graphical markups to a displayed image. In addition, markup tools may include a delete markup tool and an undo/redo tool.

Markup services module 130 is activated by the controlling user by clicking on any of the markup tool icons 186 on the user interface window 180 at the controlling client computer. The controlling user may then add markup items to the displayed image to identify part of the document that is of interest, to suggest changes to the displayed image or for any other purpose. The markup services module 130 transmits instructions to the display module 126 to overlay the markups added by the controlling user over the image displayed in the document window 182.

As the controlling user adds markup items to the displayed image at a controlling client computer 106a, the markup items are transmitted to the viewing client computers 106b and 106c and are also displayed on those client computers, thereby contemporaneously updating each of the displays and allowing the users of each viewing client computer to view the same marked up image. This is accomplished using a synchronization process similar to method 1000. When the user has completed each markup item, the markup services module 130 at the client computer 106a transmits a New Markup State message to the client communications module 128 at the client computer 106a. The Now Markup State message indicates any changes to the markup state since the markup services module was activated or since the last New Markup State message. In another embodiment, the markup state may include all markups since the markup services module was activated.

The client communications module 128 at the controlling computer 106a transmits the New Markup State message to the server communications module 114. The server communications module 114 stores the New Markup State message and transmits a copy of it to each of the other client communications modules 128 at the client computers 106b and 106c. Each of the other client communications modules 128 transmits a Set Markup State message to the markup services module 130. The Set Markup State message includes the markup state originally transmitted by the markup services module 130 at the client computer 106a. The markup services module changes the markup view to match the markup view set out in the Set Markup State message. This method synchronizes the display of the markup at all of the client computers 106.

By providing markup services in the collaboration module 118, rather than in the document objects 124, the markup tools are made available for use with all documents. A particular document object 124 may include additional markup tools that are useful for document supported by the document object.

A view of a document may be saved by the view services module 133. In system 100, a view of a document describes a specific display state (managed by a document object 124) and a markup state (managed by the markup Services module 130). The view services module 133 provides a save view tool which allows the user to save the view. When the controlling user clicks on a "Save View" button 192 at the controlling client computer 106, a dialog box is presented to allow the controlling user to specify a name for the view. When the controlling user chooses to save a new view, the current display state of the document present displayed in the document window 182 is obtained from the document object. The view series module 133 transmits a Get Display State message to the document object 124, which returns the display state of the object. In addition, the view services module 133 transmits a Get Markup State message to the markup services module 130, which returns the current markup state, identifying all markups currently displayed in the document display. The view services module 133 then stores the new view at the controlling computer. The name of the new view is displayed in a view list 190. The display state and markup state provided by the document object 124 and markup services module 131 is recorded so that the same view of the document may be displayed later.

The new view is also added at the viewing client computers 106 in a synchronization process. The view services module 133 at the client computer 106a transmits a New View message to the client communications module 128 at the client computer 106a. The client communications module 128 transmits the New View message to the server communications module 114. The New View message indicates the name of the new view, the document to be displayed, the display state, and the markup state that correspond to the new view. The display state and the markup state are saved by the server communications module 114 in memory device 116. The server communications module 114 transmits the New View message to the client communications modules 128 at each viewing client computer 106. The client communications modules 128 transmit the New View message to their associated view services module 133. The view services module 133 at each viewing client computer records the new view at the viewing client computer and adds the name of the new view to the local view list 190.

A saved view may be redisplayed by the controlling user by clicking on the name of the view in the view list 190. When a view is selected to be redisplayed, the view services module 133 sends the corresponding display state to the document object 124 associated with the document displayed in that view in a Set Display state message and sends the markup state associated with the view to the markup services module 130 in a Set Markup State message. The document object 124 and the markup services module 130 instruct the display module 128 to display the document in the given display state with the given markup state overlaid on the document.

The view services module 133 also transmits a Set View message to the server communications module 114. The Set View message identifies the view to be redisplayed by name. The server communications module transmits the Set view message to the client communications module 128 at each viewing client computer. The client communications module 128 pass the Set View message to its local view services module 133, which redisplays the view in the local document window 182, in the same manner as at the controlling client computer 106.

In system 100, if the display state of a document is modified while any markups are displayed, the markups are deleted. If a view containing the markups has not been saved, the markups are lost. In this system, a particular set of markups is simply overlaid on a static image of a document. In another embodiment, the markups may be presented on a layer that is referenced to the displayed object allowing the markups to be manipulated when the underlying document is manipulated. In such a system, the markups may be moved, rotated, zoomed, etc. along with the underlying document and can be retained when the underlying document is manipulated.

In another system, views may be saved automatically so that markups are not lost if the display state of a document is changed before a view has been manually saved. When a markup is first added to a displayed image, the markup services module 130 calls the view services module 133 to create a new view as described above. The new view may be named automatically by the view services module 133, or the view services module 133 may allow the controlling user to specify a name for the view. As additional markups are added or as existing markups are modified or deleted, the recorded markup state for the view in storage device 116 is updated to retain the change.

Figure 6:
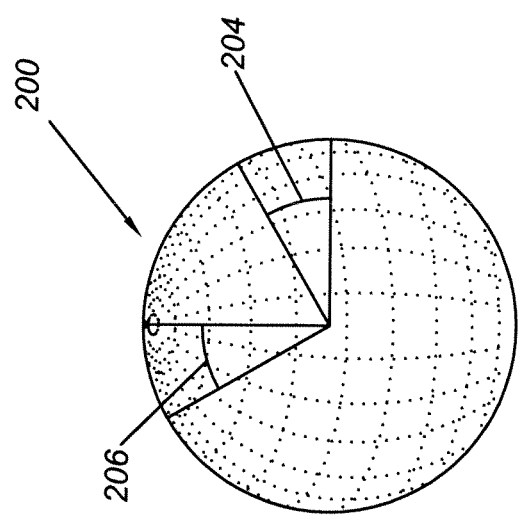

In addition to the rotational view document described above, system 100 can also display other types of documents. Referring to FIG. 6, a panorama document 200 is illustrated. Panorama document 200 is a representation of a 3D panoramic image taken from a central viewpoint. At any particular time, a viewer can only see a part of the panorama. A display state for a panorama document can be defined by setting out:

(i) a horizontal angle 204 from a reference horizontal direction;

(ii) a vertical angle 206 from a reference vertical direction;

(iii) a displacement in the horizontal and vertical directions from the specific point on the panorama identified by the horizontal angle 204 and the vertical angle 206; and (iv) a zoom that defines the magnification of the image to be displayed.

Collaboration module 118 includes a document object 124 capable of displaying a portion of a panorama document 200 in the document display window 182 of a user interface 180 based on the display state of the panorama object. The document object 124 includes document manipulation tools allowing a controlling user to change the display state and document manipulation icons 184 corresponding to each document manipulation tool is presented in the user interface 180 when a panorama document is displayed.

Manipulations of panorama documents and the other documents described below are synchronized on viewing client computers in the same manner as described above in relation to the rotational view document.

Figure 7:
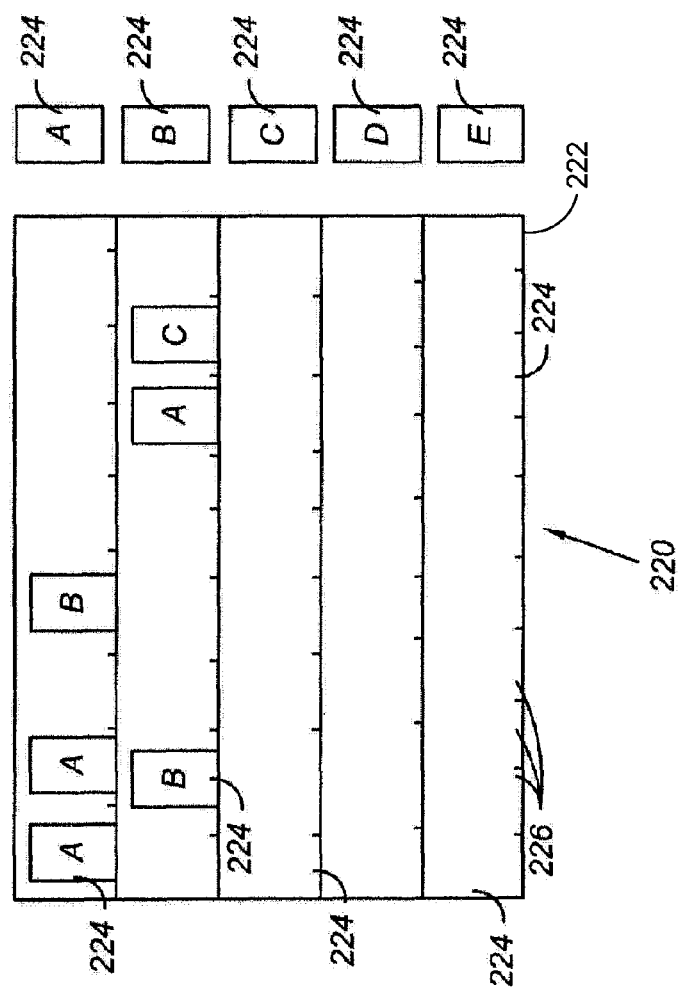

FIG. 7 illustrates a planogram document that is supported by system 100. A planogram document 220 has a base image 222, which typically illustrates a shelving or storage unit. In addition, a planogram document includes one or more product images 224. Each product image 224 represents a product that may be displayed on a shelf in a retail store. The product images and the base image are preferably, although not necessarily, sized to the same scale. The base image is divided into a plurality of storage spaces 226 which may be of the same or different sizes. Some or all of the product images 224 may be positioned in some or all of the storage spaces 226, representing storage of the corresponding product in the corresponding space on the shelf of storage unit. Planogram documents allow retailers to work with colleagues at different locations to determine how to arrange products on shelves or other storage units at their retail locations. The planogram base image 222 is designed to reflect the actual storage units at the retail locations and is divided into storage spaces reflective of the type and dimensions of the products to be stored in those units. The product images 224 are preferably on the same scale, allowing the retailer to efficiently design storage layouts.

System 100 includes a planogram document object that is capable of displaying the base image 222 in the document window 182 of a user interface 180 and allows a controlling user to selectively position product images 224 over the base image 222 in alignment with the storage spaces.

The display state of a planogram object may be defined by setting out the product image 224 to be stored in each storage space. This may be done by assigning a code to each product image 224 and then identifying the product image to be stored in each storage space by code. Storage spaces 226 which do not have a product image overlaid on them may have a null code to indicate they are empty.

The planogram document object 124 provides planogram document manipulation tools that allow the user to view all or part of a storage unit, zoom in on parts of the storage unit and to add or remove product images 224 from the base image 222. When the base image 222 is manipulated, the planogram document object manipulates the product images 224 overlaid on the base image 222 so that they appear in the same storage spaces and on the same scale.

The loading and display of planogram object is synchronized in the same manner as described above in relation to a rotational view object 134. A planogram may similarly be marked up and views of it may be saved and redisplayed in the same manner.

Figure 8:
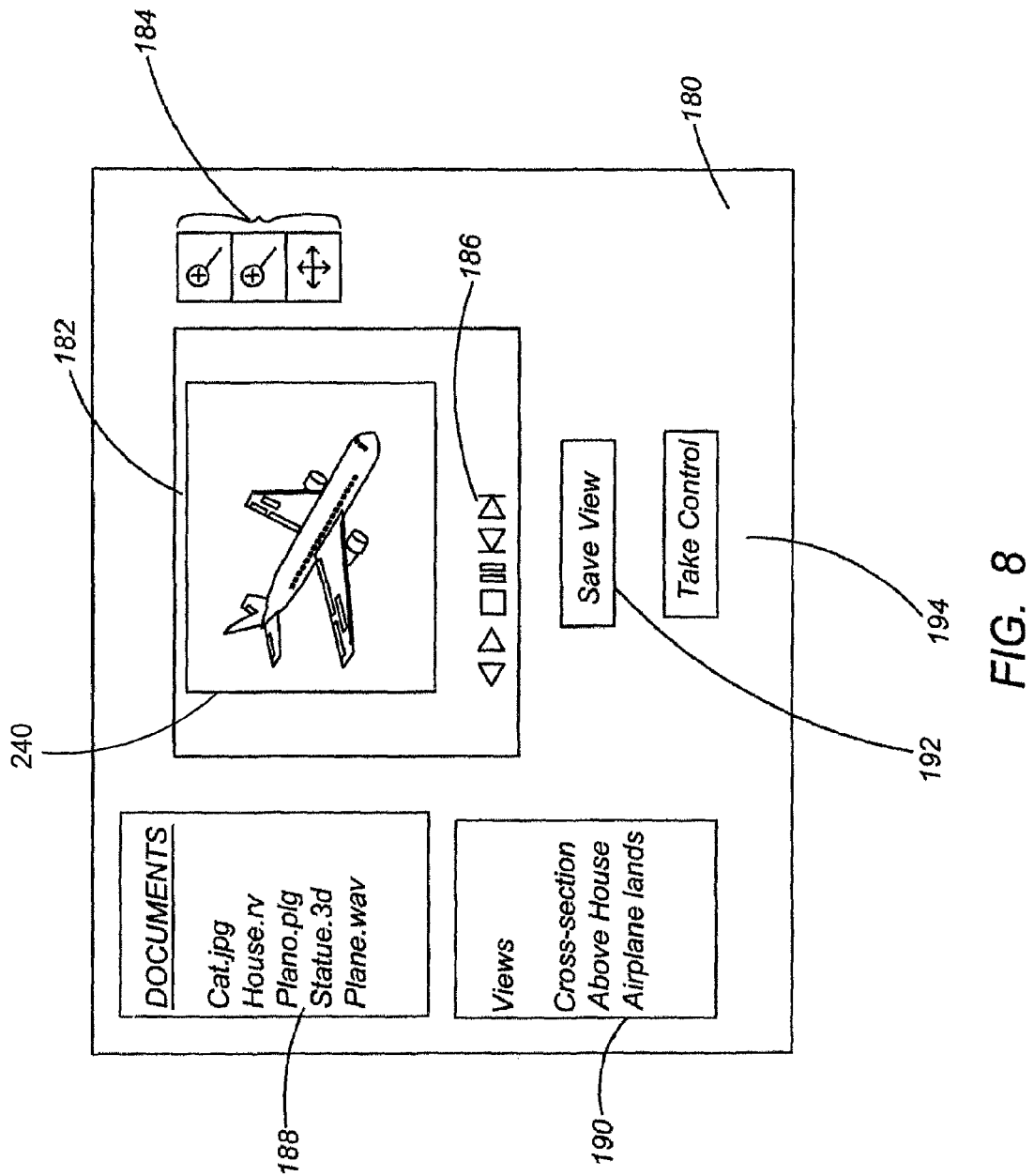
FIG. 8 illustrates a video document that is supported by the system in accordance with an illustrative embodiment.

Reference is next made to FIG. 8, which illustrates a video document 240 that is supported by system 100. Video document 240 is illustrated in the document window 182 of the user interface 180. Video document 240 is a video clip and may include an audio track. A video document object 124 in the collaboration module 118 allows the video clip to be displayed using the display module 126. Video document object 124 includes transport controls allowing the video to be played, stopped, or paused and allows a controlling user to step through the video frame by frame in the forward or reverse direction. The video document displays icons 186 for these transports on the user interface 180. The transport controls are made available to the controlling user through icons displayed in the user interface 180 when a video document is displayed in the document window 182. The display state of a video document may be defined as one of the following states:
  (i) stop at specified frame;
  (ii) play forward at specified speed from specified frame;
  (iii) play reverse at specified speed from specified frame; or
  (iv) pause at specified frame.

The markup services modules may be used to overlay markups over a video when a specific frame is displayed. Views of individual frames and associated markups may also be saved.

The display of a video and markups and the creation and redisplay of views at the controlling client computer 106 is synchronized as described above in relation to rotational view documents.

When system 100 is in use, the users of the client computers may wish to participate in an audio conversation. Optionally a system according to the present invention may incorporate an audio chat functionality using VoIP or other audio chat technology. The user may also use an independent audio communication system such as a telephone system based conference call.

In system 100, the document object 124 provide all document manipulation tools used to change the display of a document (not including markups, which are provided by the markup services module in collaboration module 118 and which are available for all documents). In another embodiment, the collaboration module may include a basic document manipulation module that provides some document manipulation tools for all documents. For example, in one embodiment, the basic document manipulation module may provide displacement and zoom tools. The user interface 180 would include icons for these tools and the document objects 124 would not need to provide these tools. This embodiment allows basic tools to be implemented once while still allowing document objects to include more advanced document manipulation tools relating to specific document types.

In system 100, the display state of a document is managed at each client computer by the document object 124 that manages the display of the document. The document object 124 records the current display state of a document and is configured to display a document in any valid display state (as may be required by a New Display State message, a Set Display State or a Set View message). As a result, the display state of the document is tracked by the document object 124 directly.

In another embodiment where the collaboration module provides some document manipulation tools, the collaboration module may track the state of corresponding aspects of the display state of the object. For example, if a collaboration module provides displacement and zoom tools, the collaboration module may maintain the display state of a document for these tools. If the document object also provides other tools, the document object may maintain the display state relative to those tools. The complete display state for the object includes the components of the display state maintained by both the collaboration module and the document object.

In another embodiment, the collaboration module may maintain the display state for all aspects of a document's display, even if the tools for some aspects of the display state are provided in a document object. In this case, the collaboration module may invoke functions within the document object to manipulate the display of a document. The collaboration module may pass all or some of the display state of the object to the document module of the invoked functions.

In system 100, different documents are displayed and manipulated using document objects that are configured to operate with certain document types. In another embodiment, a foreign document object may be configured to convert documents for which a specific document object has not been provided into a standard format (or one of a number of formats) that can be displayed by the foreign document object. For example, documents for which no specific document object is provided may be converted into a graphic format (in JPEG, TIFF, GIF or another format), a cross-platform document format (such as PDF) or into another format (such as SWF). The converted version of the document may then be displayed and the user may manipulate and markup the converted version of the document. A foreign document object may optionally convert a multi-page document into a corresponding multi-page documents and my provide page flipping or page transport controls to manipulate the display of the converted document.

The present invention has been described here by way of example only. Various modifications and variations may be made to these exemplary embodiments without departing from the spirit and scope of the invention.

I claim:

1. A method for collaborative display and markup of a document comprising:
  in response to a request from a controlling client computer, loading the document at a server;
  transmitting the document to a plurality of client computers, including the controlling client computer, such that the document is displayed on the plurality of client computers in an initial display state;
  receiving, from the controlling client computer, a new display state message indicating a new display state of the document at the controlling client computer and a new view message, wherein the new display state message comprises a document identifier, a displacement from a display state, a zoom level, and a markup layer, wherein the markup layer comprises a markup superimposed over the document, wherein the new view message includes a name of a view associated with the new display state, and wherein the name of the view is for display in a list of views; and transmitting a version of the new display state message to each of the client computers, except the controlling client computer, such that the document is updated on each of the client computers in accordance with the new display state of the document at the controlling client computer.

2. The method of claim 1, wherein the new view message includes view data comprising a markup state for the document, and further comprising:

recording the view data; and transmitting the view data to the client computers, except for the controlling client computer.

3. The method of claim 2, wherein the name of the view corresponds to a first view, and further comprising:

receiving, from the controlling client computer, a set view message identifying a second view;

retrieving view data corresponding to the second view; and transmitting the view data corresponding to the second view to each of the client computers.

4. The method of claim 1, wherein the document comprises a video comprising a plurality of frames and wherein the display state is defined by at least one of the following states: stop at a specified frame, play forward at specified speed from a specified frame, play forward from a specified frame, play reverse at a specified speed from a specified frame, play reverse from a specified frame, jump to a specified frame, and pause at a specified frame.

5. The method of claim 1, wherein the document comprises a video and further comprising:

receiving, from the controlling client computer, a new markup state message indicating one or more markups superimposed on a display of a frame of the video at the controlling client computer, wherein the new markup state message includes the frame; and transmitting a version of the new markup state message to the plurality of client computers such that the one or more markups can be superimposed on the document at each of the plurality of client computers, except the controlling client computer.

6. The method of claim 1, wherein the document comprises a text document, a two-dimensional image, a three-dimensional image, a spreadsheet, a video stream, a video clip, an audio stream, a panorama, a floor plan, or an audio clip.

7. The method of claim 1, wherein each client computer stores a plurality of document objects and a display module, wherein each document object is capable of maintaining the display state of the document, wherein the display module is capable of displaying the document according to instructions received from the document object, wherein each document is associated with a document type, and wherein each of the plurality of document objects is specific to a particular document type.

8. The method of claim 7, wherein each document object includes manipulation tools that correspond to the document type.

9. The method of claim 1, further comprising recording the new display state of the new display state message at the server.

10. The method of claim 1, further comprising transmitting a version of the new display state message to the controlling client computer.

11. The method of claim 1, wherein the displacement comprises a two-dimensional displacement defined by an X direction displacement and a Y direction displacement.

12. The method of claim 1, wherein the displacement comprises a three-dimensional displacement defined by an X direction displacement, a Y direction displacement, and a Z direction displacement.

13. The method of claim 1, wherein the document comprises a video having a plurality of frames, and wherein the displacement comprises a specified frame of the video.

14. The method of claim 1, wherein the markup comprises an addition, deletion, or change to the document in the form of a freehand drawing, a circle, an ellipse, or text, and further wherein the version of the new display state message is transmitted whenever the addition, the deletion, or the change occurs.

15. The method of claim 1, further comprising storing the name of the view and the new display state when the markup is added, deleted, or changed.

16. The method of claim 1, wherein transmitting the version of the new display state message occurs when a predetermined number of markups have been added, deleted, or changed.

17. A method of collaboratively displaying a document comprising:

transmitting a document to a plurality of client computers such that the document can be displayed at the plurality of client computers in an initial display state;

transmitting, to the plurality of client computers, a new display state message indicating a new display state of the document and a new view message, wherein the new display state message comprises a document identifier, a displacement from a previous display state, a zoom level such that the document can be displayed at the plurality of client computers in accordance with the new display state, and a markup layer, wherein the markup layer comprises a markup superimposed over the document, wherein the new view message includes a name of a view associated with the new display state, and wherein the name of the view is for display in a list of views.

18. The method of claim 17, further comprising:

receiving a request from a controlling computer to take control of the document;

allowing the controlling computer to manipulate the document; and receiving the new display state message from the controlling computer, wherein the new display state of the document results from manipulation of the document by the controlling computer.

19. A method for collaborative display of a document:

displaying the document on a first client computer, wherein the document corresponds to a type of document, wherein the first client computer comprises a document object compatible with the type of document, wherein the compatible document object maintains a display state of the document, and wherein the compatible document object includes a plurality of manipulation tools for manipulating a display of the document;

receiving a message describing a manipulation of the display of the document on a second client computer, wherein the message comprises a new display state defined by a document identifier, a reference point from a previous display state, a zoom level, a name of a view associated with the new display state, and a markup layer, wherein the markup layer comprises a markup superimposed over the document and wherein the name of the view is for display in a list of views; and synchronizing the display of the document on the first client computer with that of the second client computer using the compatible document object and the new display state.

20. An apparatus comprising:
a memory; and
a communication device operatively coupled to the memory, wherein the communication device is configured to:
  transmit a document to a plurality of client computers, including a controlling client computer, such that the document is displayed on the plurality of client computers in an initial display state;
  receive, from the controlling client computer, a new display state message indicating a new display state of the document at the controlling client computer and a new view message, wherein the new display state message comprises a document identifier, a displacement from the initial display state, a zoom level, and a markup layer, wherein the markup layer comprises a markup superimposed over the document, wherein the new view message includes a name of a view associated with the new display state, and wherein the name of the view is for display in a list of views; and
  transmit a version of the new display state message to each of the client computers, except the controlling client computer, such that the document is updated on each of the client computers in accordance with the new display state of the document at the controlling client computer.

21. The apparatus of claim 20, wherein the displacement comprises at least a two-dimensional displacement defined by an X direction displacement and a Y direction displacement.

* * * * *